United States Patent
Lai et al.

(10) Patent No.: US 9,990,432 B1
(45) Date of Patent: Jun. 5, 2018

(54) GENERIC FOLKSONOMY FOR CONCEPT-BASED DOMAIN NAME SEARCHES

(71) Applicant: Go Daddy Operating Company, LLC, Scottsdale, AZ (US)

(72) Inventors: Wei-Cheng Lai, Cupertino, CA (US); Yang Zhao, Sunnyvale, CA (US); Moninder Jheeta, Fremont, CA (US); Tapan Kamdar, San Jose, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 743 days.

(21) Appl. No.: 14/569,348

(22) Filed: Dec. 12, 2014

(51) Int. Cl.
*G06F 17/30* (2006.01)

(52) U.S. Cl.
CPC .. *G06F 17/30867* (2013.01); *G06F 17/30899* (2013.01)

(58) Field of Classification Search
CPC ......... G06F 17/30867; G06F 17/30887; G06F 17/30899
USPC ........................................ 707/708, 737, 767
See application file for complete search history.

(56) References Cited

U.S. PATENT DOCUMENTS

| | | | |
|---|---|---|---|
| 6,298,341 B1 | 10/2001 | Mann et al. | |
| 6,332,158 B1 | 12/2001 | Risley et al. | |
| 6,519,589 B2 | 2/2003 | Mann et al. | |
| 6,895,430 B1 | 5/2005 | Schneider | |
| 7,103,607 B1 * | 9/2006 | Kirkwood | G06Q 10/00 |
| 7,143,048 B1 | 11/2006 | Ruben et al. | |
| 7,392,255 B1 | 6/2008 | Sholtis et al. | |
| 7,702,636 B1 | 4/2010 | Sholtis et al. | |
| 7,904,333 B1 | 3/2011 | Perkowski | |
| 8,301,743 B2 | 10/2012 | Curran et al. | |
| 8,527,493 B1 * | 9/2013 | Hamatake | G06F 17/30864 707/707 |
| 8,566,928 B2 | 10/2013 | Dagon et al. | |
| 8,706,728 B2 | 4/2014 | Nicks et al. | |
| 8,719,005 B1 | 5/2014 | Lee et al. | |
| 9,053,146 B1 | 6/2015 | Kapoor et al. | |
| 9,215,123 B1 | 12/2015 | Fears et al. | |
| 9,560,072 B1 | 1/2017 | Xu | |
| 9,606,982 B2 | 3/2017 | MacMillan et al. | |
| 2002/0099723 A1 | 7/2002 | Garcia-Chiesa | |
| 2002/0194373 A1 | 12/2002 | Choudhry | |
| 2003/0139975 A1 | 7/2003 | Perkowski | |
| 2003/0149690 A1 | 8/2003 | Kudlacik et al. | |

(Continued)

OTHER PUBLICATIONS

Google SafeSearch Filtering (http://web.archive.org/web/20030702191745/http://www.google.com/intl/en/help/customize.html), Jul. 2003, WaybackMachine.

(Continued)

*Primary Examiner* — Hares Jami
(74) *Attorney, Agent, or Firm* — Quarles & Brady LLP

(57) ABSTRACT

Systems and methods of the present invention provide for one or more server computers communicatively coupled to a network and configured to: receive a domain name search string; tokenize the domain name search string; identify, based on at least one token in the domain name search string, one or more concepts comprising a collection of data records comprising a common concept id and/or one or more languages; and recommend at least one available domain name comprising the one or more concepts and in the one or more languages.

20 Claims, 6 Drawing Sheets

(56) References Cited

U.S. PATENT DOCUMENTS

| | | |
|---|---|---|
| 2005/0125451 A1 | 6/2005 | Mooney |
| 2005/0172031 A1 | 8/2005 | Adelman |
| 2005/0177805 A1 | 8/2005 | Lynch et al. |
| 2006/0218303 A1 | 9/2006 | Adelman et al. |
| 2007/0055525 A1 | 3/2007 | Kennewick et al. |
| 2007/0130112 A1* | 6/2007 | Lin .................... G06F 17/3002 |
| 2007/0250468 A1 | 10/2007 | Pieper |
| 2007/0271393 A1 | 11/2007 | Wong |
| 2008/0033970 A1 | 2/2008 | Jones et al. |
| 2008/0066080 A1 | 3/2008 | Campbell |
| 2008/0071909 A1 | 3/2008 | Young et al. |
| 2008/0222125 A1 | 9/2008 | Chowdhury |
| 2008/0250159 A1 | 10/2008 | Wang et al. |
| 2008/0270203 A1 | 10/2008 | Holmes et al. |
| 2008/0270486 A1 | 10/2008 | Hind et al. |
| 2008/0307049 A1 | 12/2008 | Curran et al. |
| 2008/0307085 A1 | 12/2008 | Curran et al. |
| 2008/0313130 A1 | 12/2008 | Hammond et al. |
| 2008/0313352 A1 | 12/2008 | Telesco |
| 2009/0094137 A1 | 4/2009 | Toppenberg et al. |
| 2009/0241066 A1 | 9/2009 | Costello |
| 2009/0248734 A1 | 10/2009 | Adelman et al. |
| 2009/0248735 A1* | 10/2009 | Adelman .......... G06F 17/30705 |
| 2009/0282038 A1 | 11/2009 | Subotin et al. |
| 2010/0023514 A1 | 1/2010 | Parikh |
| 2010/0070448 A1 | 3/2010 | Omoigui |
| 2010/0114879 A1* | 5/2010 | Zhong .................. G06F 17/278 707/723 |
| 2010/0179929 A1 | 7/2010 | Yin et al. |
| 2010/0211588 A1* | 8/2010 | Jiang ................ G06F 17/30637 707/768 |
| 2010/0268701 A1 | 10/2010 | Zhang et al. |
| 2011/0016022 A1 | 1/2011 | Essawi et al. |
| 2011/0055248 A1 | 3/2011 | Consuegra et al. |
| 2011/0125830 A1 | 5/2011 | Adelman |
| 2011/0125831 A1 | 5/2011 | Adelman |
| 2011/0208513 A1 | 8/2011 | Nicks et al. |
| 2011/0208723 A1 | 8/2011 | Nicks et al. |
| 2011/0258237 A1 | 10/2011 | Thomas |
| 2012/0072407 A1 | 3/2012 | Shyamsunder et al. |
| 2012/0310955 A1* | 12/2012 | Uszkoreit .............. G06Q 30/00 707/754 |
| 2013/0014253 A1 | 1/2013 | Neou et al. |
| 2013/0132366 A1 | 5/2013 | Pieper |
| 2013/0185311 A1 | 7/2013 | MacMillan et al. |
| 2014/0032589 A1 | 1/2014 | Styler et al. |
| 2014/0047315 A1 | 2/2014 | Williams |
| 2014/0074812 A1 | 3/2014 | Ruhela et al. |
| 2014/0096249 A1 | 4/2014 | Dupont et al. |
| 2014/0229476 A1 | 8/2014 | Fouad et al. |
| 2015/0081440 A1 | 3/2015 | Blemaster |
| 2015/0120447 A1 | 4/2015 | Blemaster |
| 2015/0120691 A1 | 4/2015 | Blemaster |
| 2015/0120696 A1 | 4/2015 | Blemaster |
| 2015/0186808 A1* | 7/2015 | Petitclerc .......... G06Q 10/0637 705/7.36 |
| 2015/0212710 A1 | 7/2015 | Gupta et al. |
| 2016/0055490 A1 | 2/2016 | Keren et al. |
| 2016/0099961 A1 | 4/2016 | Paugh et al. |
| 2016/0119282 A1 | 4/2016 | Bladel |
| 2016/0171115 A1 | 6/2016 | Jheeta et al. |
| 2016/0239899 A1 | 8/2016 | Kamdar et al. |
| 2016/0239900 A1 | 8/2016 | Kamdar et al. |
| 2016/0241510 A1 | 8/2016 | Kamdar et al. |
| 2016/0283952 A1 | 9/2016 | Hall |

OTHER PUBLICATIONS

"Domain Name Search." Jan. 31, 2001. www.domainsearch.com.
Margaret Rouse (Crawler, TechTarget: SearchSOA, Apr. 5, 2005). http://searchsoa.techtarget.com/definition/crawler.
Bresenham et al., "IBM System i5 Handbook", IBM i5/OS Version 5 Release 4, Jan. 2006, pp. 1-221.
Bresenham et al., "IBM System i5 Handbook", IBM i5/OS Version 5 Release 4, Jan. 2006, pp. 222-442.

* cited by examiner

GENERIC FOLKSONOMY FOR CONCEPT-BASED DOMAIN NAME SEARCHES

FIELD OF THE INVENTION

The present invention generally relates to the field of domain names and, as a specific example, to the field of suggesting domain names to a user based on the frequency and/or co-occurrence of terms within the domain names.

SUMMARY OF THE INVENTION

The present inventions provide methods and systems comprising one or more server computers communicatively coupled to a network and configured to: aggregate a plurality of knowledge base data comprising a plurality of tokens; identify a plurality of available domain names based on a difference between the plurality of tokens within the plurality of knowledge base data; eliminate from the plurality of available domain names, at least one grammatically incorrect domain name; rank the plurality of available domain names according to a machine learning algorithm; and transmit the plurality of available domain names to a client computer communicatively coupled to the network.

Other embodiments may include one or more server computers communicatively coupled to a network and configured to: receive a domain name search string; identify: a token, within the domain name search string, reflecting a user pattern; a next element in a sequence for the user pattern; and an available domain name comprising a string reflecting the next element in the sequence; and transmit the available domain name to a client computer communicatively coupled to the network.

Other embodiments may include one or more server computers communicatively coupled to a network and configured to: receive a domain name search string; tokenize the domain name search string; identify, based on at least one token in the domain name search string, one or more concepts comprising a collection of data records comprising a common concept id and/or one or more languages; and recommend at least one available domain name comprising the one or more concepts, possibly in the one or more languages.

The above features and advantages of the present invention will be better understood from the following detailed description taken in conjunction with the accompanying drawings.

DETAILED DESCRIPTION

Figure 1:
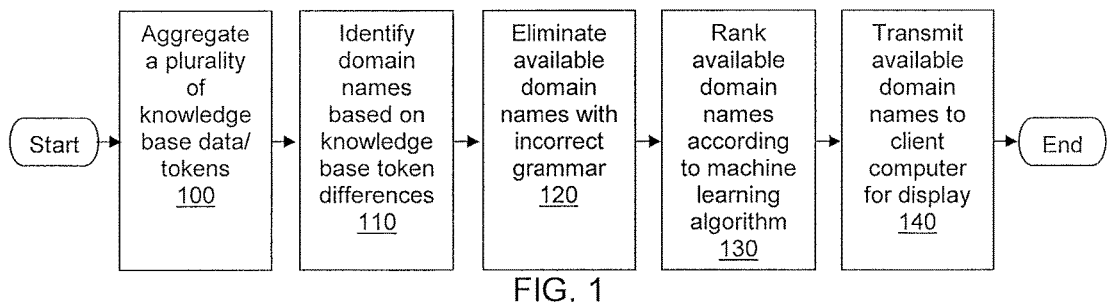
FIG. 1 is a flow diagram illustrating a possible embodiment of a method for learning from users for domain name generation and ranking.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The Internet is a worldwide network of computers and computer networks arranged to allow the easy and robust exchange of information between computer users on clients. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Websites may consist of a single webpage, but typically consist of multiple interconnected and related web pages. Menus, links, tabs, etc. may be used to move between different web pages within the website or to move to a different website.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user on the client. The user then may view other webpages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites 104 because each website 104, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154: 7313).

IP addresses, however, even in human readable notation, are difficult for people to remember and use. A Uniform Resource Locator (URL) is much easier to remember and may be used to point to any computer, directory, or file on the Internet. A browser is able to access a website 104 on the Internet through the use of a URL. The URL may include a Hypertext Transfer Protocol (HTTP) request combined with the website's Internet address, also known as the website's domain name. An example of a URL with a HTTP request and domain name is: www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the Registry 107 is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD. TLDs may also be referred to as domain name extensions.

The process for registering a domain name with .com, .net, .org, and some other TLDs allows an Internet user to use an ICANN-accredited Registrar to register their domain name. For example, if an Internet user, John Doe, wishes to register the domain name "mycompany.com," John Doe may initially determine whether the desired domain name is available by contacting a domain name registrar. The Internet user may make this contact using the Registrar's webpage and typing the desired domain name into a field on the registrar's webpage created for this purpose. Upon receiving the request from the Internet user, the Registrar may ascertain whether "mycompany.com" has already been registered by checking the SRS database associated with the TLD of the domain name or by checking with the Registry. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

A current problem many Internet users face is trying to find a domain name that is available. It is generally desirable to have a domain name that is as generic and short as possible. A generic domain name makes a website easier to find, thereby increasing its traffic, while shorter domain names are easier to remember and enter into a browser. Unfortunately, many people want the same short generic domain names making it difficult for new Internet users to find a good domain name that is not already registered. The present invention addresses the problem of finding a good available domain name.

Many current-available solutions to finding the ideal available domain name rely on static language dictionaries including information such as part-of-speech and synonyms. Issues associated with this static approach include, for example, a limited number of synonyms, static vocabulary dictionaries which do not rank the popularity of synonyms when considering name ranking, and no consideration of domain name transformation types.

As more and more organizations expand internationally, registrars are offering domain names incorporating more and more additional languages. These registrars require a scalable and efficient way to utilize multilingual domain name search engines to include these additional languages.

The current invention addresses these types of issues by providing domain name generation, filtering of low-quality domain names, and domain name ranking. This invention identifies interchangeable terms together with their popularity based on frequency of use as analyzed from data within domain names search logs and domain name zone files 320. Language models for name filtering and machine-learned ranking further refines the quality of domain name search suggestions while avoiding false positives or spurious suggestions.

The current invention also addresses issues surrounding multilingual domain name searching by providing methods and systems that evolve with the regional shoppers in term of picking up local trends and folksonomy.

Several different methods may be used to provide and manage the present systems and methods. In the example embodiment shown in FIG. 1, one or more server computers may be communicatively coupled to a network and operated by a hosting provider. These server(s) may be configured to: aggregate a plurality of knowledge base data comprising a plurality of tokens (Step 100); identify a plurality of available domain names based on a difference between the plurality of tokens within the plurality of knowledge base data (Step 110); eliminate from the plurality of available domain names, at least one grammatically incorrect domain name (Step 120); rank the plurality of available domain names according to a machine learning algorithm (Step 130); and transmit the plurality of available domain names to a client computer communicatively coupled to the network (Step 140).

Figure 6:
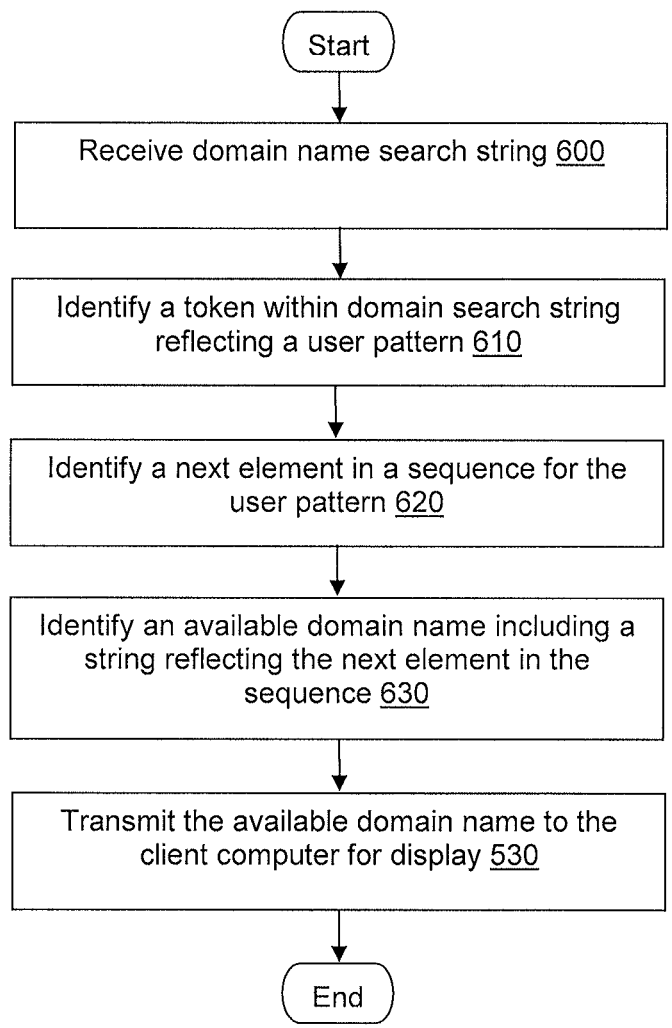
FIG. 6 is a flow diagram illustrating a possible embodiment of a method for learning from users for domain name generation and ranking.

In the example embodiment shown in FIG. 6, one or more server computers communicatively coupled to a network may be configured to: receive a domain name search string; identify: a token, within the domain name search string, reflecting a user pattern; a next element in a sequence for the user pattern; and an available domain name comprising a string reflecting the next element in the sequence; and transmit the available domain name to a client computer communicatively coupled to the network.

Figure 7:
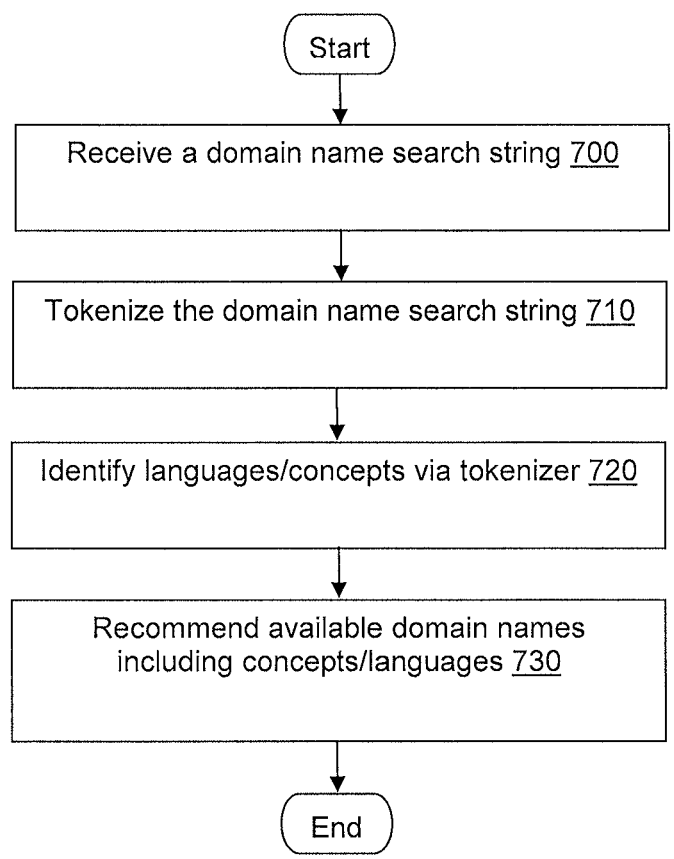
FIG. 7 is a flow diagram illustrating a possible embodiment of a method for learning from users for domain name generation and ranking.

In the example embodiment shown in FIG. 7, one or more server computers may be configured to: receive a domain name search string; tokenize the domain name search string; identify, based on at least one token in the domain name search string, one or more concepts comprising a collection of data records comprising a common concept id and/or one or more languages; and recommend at least one available domain name comprising the one or more concepts in the one or more languages.

Figure 2:
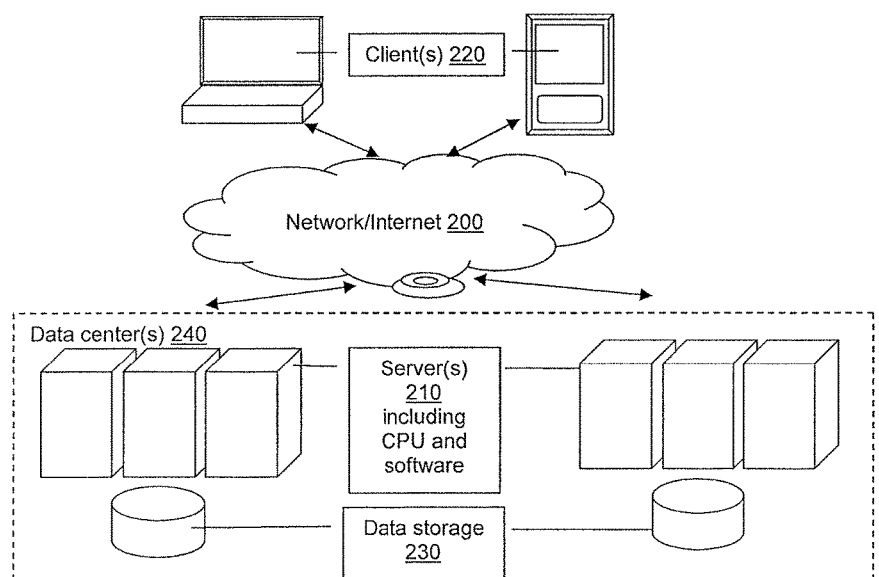
FIG. 2 illustrates a possible system for learning from users for domain name generation and ranking.

Several different environments may be used to accomplish the method steps of embodiments disclosed herein. FIG. 2 demonstrates a streamlined example and FIG. 3 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules/components) in computer-readable media accessible to the CPU, such as a hard disk drive on a server 210 and/or client 220.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 220 that may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 210 may be communicatively coupled to data storage 230 including any information requested or required by the system and/or described herein. The data storage 230 may be any computer components, devices, and/or recording media that may retain digital data used for computing for some interval of time. The storage may be capable of retaining stored content for any data required, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 210 or software modules within the server(s) 210 may use query languages such as MSSQL or MySQL to retrieve the content from the data storage 230. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 210. As non-limiting examples of such software, the paragraphs below describe in detail the software modules/components that make up the software combination. These software modules/components may comprise software and/or scripts containing instructions that, when executed by a microprocessor on a server 210 or client 220, cause the microprocessor to accomplish the purpose of the module/component as described in detail herein. The software combination may also share information, including data from data sources and/or variables used in various algorithms executed on the servers 210 and/or clients 220 within the system, between each module/component of the software combination as needed.

A data center 240 may provide hosting services for the software combination, or any related hosted website including, but not limited to hosting one or more computers or servers in a data center 240 as well as providing the general infrastructure necessary to offer hosting services to Internet users including hardware, software, Internet web sites, hosting servers, and electronic communication means necessary to connect multiple computers and/or servers to the Internet or any other network 200.

Figure 3:
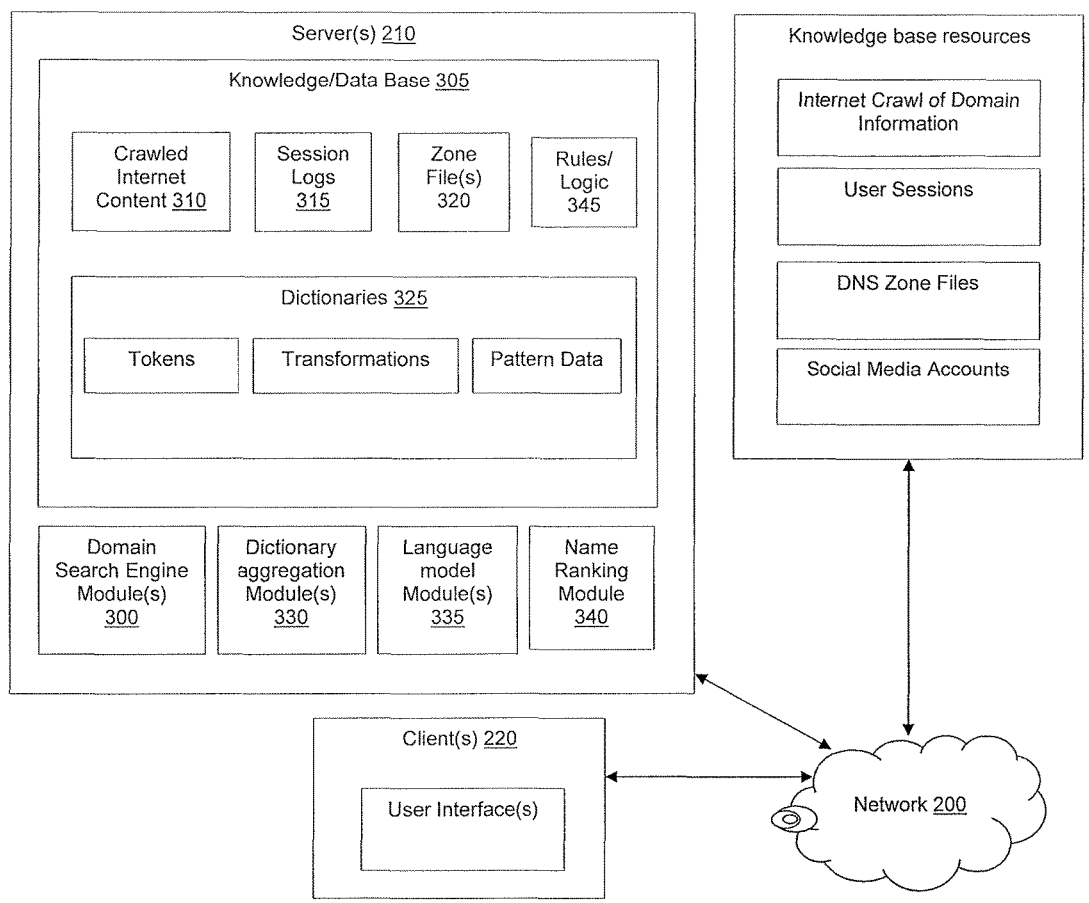
FIG. 3 illustrates a more detailed possible system for learning from users for domain name generation and ranking.
Figure 4:
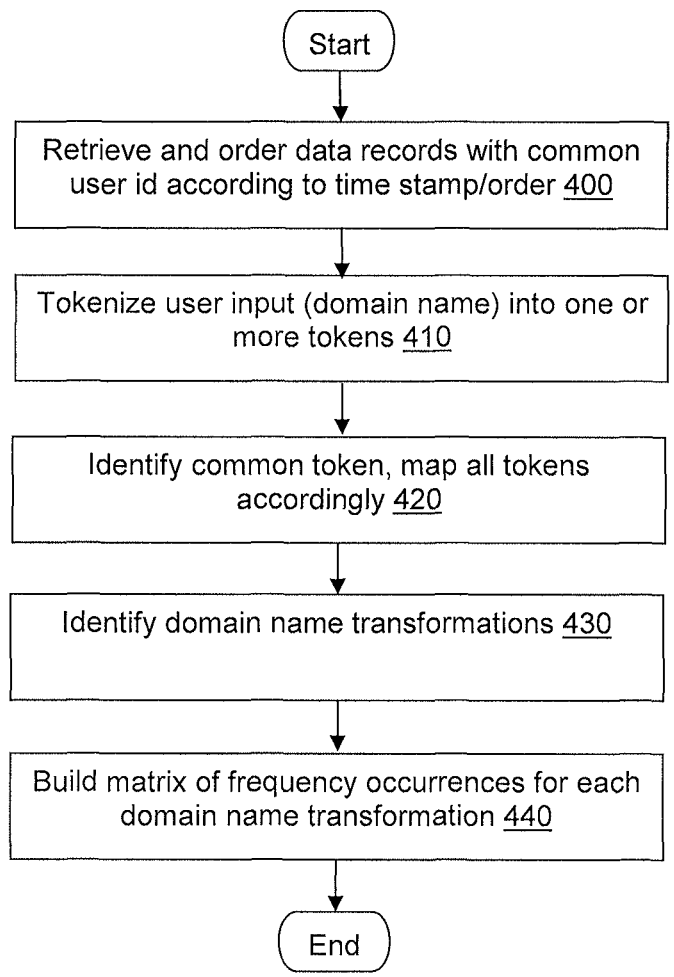
FIG. 4 is a flow diagram illustrating a possible embodiment of a method for learning from users for domain name generation and ranking.

FIG. 3 shows a more detailed example embodiment of an environment for accomplishing the systems and method steps disclosed herein. As non-limiting examples, all disclosed software modules may run on one or more server(s) 210 and may include one or more user interfaces generated by the server(s) 210 and transmitted to and displayed on the client(s) 220. The user interface(s) may be configured to receive input from the user and transmit this input to the server(s) 210 for the administration and execution of the software, using data in data storage 230 associated with the software modules.

As a non-limiting example, the disclosed invention may intelligently generate a ranked list of available domain names in response to a domain name search. In the event that a searched domain name is not available, a domain name search engine 300 may analyze the resources within a knowledge base of aggregated resources 305 and recommend alternative domain names. The domain name search engine 300 may then generate, rank and transmit the alternative domain names to a user's client computer 220 for display.

In addition to the domain name search engine 300, FIG. 3 demonstrates that server(s) 210 may host and/or run any combination of one or more dictionary aggregation software modules 330, one or more language model software modules 335 and/or one or more domain name suggestion ranking software modules 340. Any combination of the disclosed software modules may be configured to execute any or all of the method steps disclosed herein.

Server(s) 210, including this disclosed software, may be hosted by any entity, possibly a hosting provider, a domain name registrar, a website development company, any other software service provider or any combination thereof. To manage users of such a system, server(s) 210 may host and run a user administration program such as GoDaddy's My Account control panel for managing hosting and domain names, as a non-limiting example.

In such an administration control panel program, or admin, each user may be assigned a user ID. This user ID may identify transactions performed by each user. These transactions may be stored as data records in data storage 230, each data record including the user ID to associate the user with the transaction in the database 230.

The user data table may comprise the user ID to associate these records with an individual and/or organization. In some embodiments, the user data table may include data such as a username, password, API and/or other URL to access data within a social media account for an individual or organization. The social media account may comprise data streams for the user's social media account and may be used to download, possibly via API or Internet crawl 310, personal data to be added to the aggregated resources associated with the user and to be stored in the knowledge base 305.

Non-limiting examples of the aggregated resources within the knowledge base 305 may include: 1) content scraped from crawls of Internet content 310; 2) logs recording users' domain name searches 315, including searched domain names and alternative searches if searched domain names are unavailable; and/or 3) zone files 320 listing registered domain names, generated by a registry or any other authoritative domain name source and/or downloaded by a domain name registrar or other user. These aggregated resources may apply to any language, geographic region or general related concepts. Additional example resources within the knowledge base 305 may include domains listed in a trademark clearing house, reserve domains, domains excluded from being purchased, logs from the Domain Name System (DNS), etc.

Data within the knowledge base 305 may be seeded and/or supplemented via Internet crawls 310 performed by software that systematically browses the World Wide Web to make data accessible to various search engines so that users can access content more quickly. This content may be scraped using any computer software technique of extracting information from websites. As a non-limiting example, an internet crawl 310 may be used to determine user patterns, described in more detail below, from a user's social media website.

The knowledge base 305 may be organized into one or more data dictionaries 325, accessible to all disclosed software modules. These dictionaries 325 may comprise comparative stored data used by the disclosed software modules to make identifications, comparisons, associations, categorizations, personalization, and/or calculations based on user input as disclosed herein. As a non-limiting examples, these data dictionaries 325 may comprise running totals of certain metrics determined from user actions or may comprise specific matrices of data "triples" used to determine frequency of specific actions taken by users.

As non-limiting examples, the dictionaries 325 may include a tokenization dictionary used to identify tokens within domain name searches; a domain search transformation dictionary including data about domain name searches and modifications to domain name searches; a language model dictionary identifying common co-occurrences of tokens; and user pattern data dictionaries identifying sequential or other user patterns, etc. The knowledge base 305 may also include machine learning modeling data and/or training data for machine learning. Additional data libraries 325 may be described as appropriate herein.

The configuration of the software to analyze data in data dictionaries 325 may be according to one or more software logic rules 345 integrated into the software itself, or stored as part of the knowledge base 305. These rules may comprise the software instructions and/or logic that allows the software to accomplish the disclosed method steps.

Rules 345 logic may be applied to the data dictionaries 325. As non limiting examples, the rule 345 logic may used to: identify geographic locations, dates, translations, etc., associated with the tokenized tokens, possibly by comparing them with a geographic, date and/or translation dictionary in the knowledge base 305 respectively; compare co-occurring tokens with grammatical rules to determine if low occurrences occur because of grammatical inconsistencies; etc.

As non-limiting examples, the disclosed invention may recommend domain names according to a recognized user pattern. The rules 345 in the software or knowledge base 305 may use identified geographic, language structure, translations, grammatical or sequential data in the disclosed data dictionaries 325.

In one non-limiting example, disclosed in more detail herein, rules 345 may instruct the disclosed software to recognize a sequential pattern in a tokenized search string and recommend a domain name based on the next logical step in the sequence.

The initial seed data for the data dictionaries 325, as well as the rules 345 and/or instructions for software stored in data storage may be generated and/or populated by any seeding entity, including a software or database administrator, software designer, user, etc.

As a non-limiting example, any of these seeding entities, including an Internet crawl 310 providing scraped content, may seed a tokenization dictionary and/or its accompanying rules 345. This tokenization dictionary may be configured to receive a plurality of words from the seeding entities in a base language, such as English.

Rules 345 may instruct any of the disclosed software to save each of these tokens within data storage 230, possibly as individual token data records. Tokenization may comprise the process of receiving a text string and breaking the string into one or more tokens, which may be words/terms, numbers, phrases and/or entities (i.e., tokens that should not be separated, such as "ice cream").

As a non-limiting example, a user may submit a search string to determine the availability of a domain name, as described herein. Search engine software 300 may be configured to tokenize the search string, possibly by comparing the domain name search string against an existing term dictionary, identifying any tokens common to both the search string and the term dictionary In some embodiments, an Aho-Corasick algorithm may be used to construct a finite state machine which may tokenize a given string into a sequence of tokens. The Aho-Corasick algorithm may comprise a string matching algorithm as is known in the art comprising a dictionary-matching algorithm that locates elements of a finite set of strings (the "dictionary") within an input text simultaneously, the algorithm constructing a finite state machine.

As a non-limiting example, given "prototype" as the search string, the algorithm may use the dictionary terms/tokens to recognize the tokens "pro," "to," "type," and "prototype."

Rules 345 may instruct the disclosed software to execute an Internet crawl of websites 310 such as open multilingual Wordnet, Freebase, Conceptnet.com, Wiktionary, Wikipedia, GeoName.org, CIA world factbook, and various token/concept related data, etc. and store the related data in association with the token data record(s).

This may both confirm the validity of the seeded tokens (and their data records), as well as augment the data to include, as non-limiting examples, definitions, synonyms, grammar rules (possibly added to the rules 345), entity identification, tokens associated with a specific geographical location or language, co-occurrences of terms (described below), etc.

Some embodiments may comprise a multilingual domain name search engine configured to group tokens and variants comprising the same semantic meaning to form a concept unit.

In some embodiments, the tokens and the concept related data from the Internet crawl 310 above may be used to generate one or more concept units. These concept units may comprise a plurality of associated words, possibly in different languages, used to determine tokens to be included in recommended domain names according to a user's preferences, nationality, language or previous domain name registrations.

Such concept units may be stored in a concept dictionary and used as a folksonomy, meaning that the concept units may be applied on an individual, regional or global level to determine the optimum suggested domain names, based on user behavior, for any individual, region, language or as a general application to all users, regardless of nationality or language.

The concept unit may comprise a plurality of tokens associated in data storage 230 with a common concept ID. The tokens may comprise an original token, synonyms of the original token, lemma of the original token (such as singular/plural variations of the original token), translations of the token into other languages, or any other relationships that may joint tokens to capture a concepts for the tokens.

In some embodiments, the concept may comprise a plurality of data records stored in data storage 230, each data record sharing a common concept ID stored in the individual data records. These data records may also comprise additional data about the token, such as one or more languages associated with the token, one or more geographical regions where the token is in use, etc.

As a non-limiting example, a concept unit may include a bicycle concept. The token "bicycle" may be selected as a concept seed from the English language. Translations of bicycle may be added to the concept unit, including bicicleta from Spanish and bicyclette in French. Lemma of bicycle may be added to the concept unit, including bicycles in English and bicyclettes in French. Synonyms may also be added to the concept unit, including bike as a synonym for bicycle.

To generate the additional tokens in the concept units, dictionary aggregation software 330 may crawl or otherwise access additional resources, such as the aforementioned Internet crawl 310 resources (i.e., open multilingual Wordnet, Freebase, Conceptnet.com (/r/TranslationOf), Wiktionary, etc. in order to identify direct translations of each token and add them to the concept dictionary, sharing a common concept ID with the concept seed.

Dictionary aggregation software 330 may then access online or other software resources to identify lemma of the concept seed. These lemma may then be added to the concept dictionary, sharing a common concept ID with the concept seed. Dictionary aggregation software may then repeat the process above for identifying and adding direct translations, but apply the translation to the identified lemma. These translated lemma may then be added to the concept dictionary, sharing a common concept ID with the concept seed.

Dictionary aggregation software 330 may then access online or other software resources to identify synonyms of the concept seed. These synonyms may then be added to the concept dictionary, sharing a common concept ID with the concept seed. It should be noted that there is no way to get comprehensive synonym/popularity from a synonym list from the Internet, so co-occurrence and/or replace dictionaries, as described herein, may be used to determine synonyms more effectively. Dictionary aggregation software 330 may then repeat the process above for identifying and adding direct translations, and apply the translation to the identified synonyms. These translated synonyms may then be added to the concept dictionary, sharing a common concept ID with the concept seed.

In addition to content from Internet crawls 310, logs from one or more user sessions 315 may also seed and supplement data in the knowledge base 305 and dictionaries 325. One non-limiting example of such a user session 315 may comprise a user searching for an available domain name.

To accomplish such a search, a user may enter a text string (e.g., "example.com") into a user interface (such as may be found on a domain name registrar's website) via a client computer 220. The client computer 220 may then transmit the text string to server(s) 210.

Server(s) 210 may receive the domain name request, run a domain name search and report the availability of the requested domain name according to techniques known in the art. If the domain name availability search determines that the domain name is available, the user may register the domain name, may add the domain name to a shopping cart and/or may run another search query. For purposes of the machine learning algorithms disclosed herein, data from the search session 315 may be preserved as data for one or more training sets, reflecting the results in the answer for the training set.

On receiving the domain name search, dictionary aggregation software 330 may detect the domain name search and be configured to begin generating a log of the user's domain name search session 315, which may identify and log actions taken by the user. The user session 315 may comprise any user actions, such as the domain name search and modifications to the original search, that occur between the user accessing and navigating away from or closing the domain name search interface. Specific user actions may include placing a searched or suggested domain name into an ecommerce shopping cart, registering a searched or suggested domain name, beginning a new/modified domain name search, etc.

The domain name search session log 315 may aggregate user actions performed during a user session, possibly as a collection of data records in data storage 230 sharing a common session ID. Each of these data records may comprise: the session ID, a user input received from the user, a time stamp indicating when the user input was received, a sequential order of each user input, a result of the user input (e.g., domain name registration, domain placed in cart, alternate domain name searched), etc. Each of these data records may then be stored in data storage 230 and used in the analysis of dictionary 325 data described herein.

As a non-limiting example of a user log entry 315 stored in data storage 230, a user may access a registrar web page to determine domain name availability. The user may search the domain name loanstar.com, which the domain name search software may determine is not available. The user may then search "loan-star.com," adding a dash to the original query. If this domain name is not available, the user may attempt the domain name "theloan.com," dropping the word star and pre pending the article "the." If this is not available, the user may attempt additional words, numbers or stemming (dropping "the," and appending "guru," or "247" resulting in "loanguru.com" or "loan247.com," or creating a stem to "loaner.com" respectively), or may replace existing words (e.g., "loanninja.com" as opposed to "loanguru.com").

After data records for a search session 315 are created, dictionary aggregation software 330 may reconstruct each original search session 315, as well as the order of each action taken by the user within the session(s), and may create an ontology for terms used in the search, thereby generating dictionary 325 data and providing learning data for machine learning.

Figure 5:
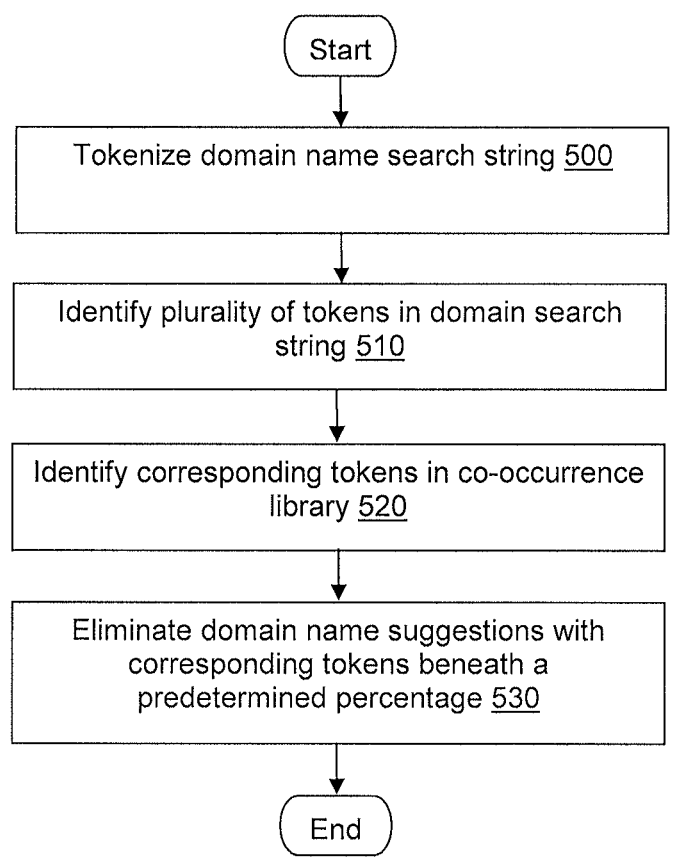
FIG. 5 is a flow diagram illustrating a possible embodiment of a method for learning from users for domain name generation and ranking.

FIG. 5 demonstrates the steps of reconstructing each original search session 315, comprising: retrieving all database records with a common user ID; ordering user input according to time stamp/sequential order (Step 400); tokenizing the user input from the user input field into one or more tokens (Step 410); identifying a token common to the tokenized user input in the user session 315; mapping/determining a position of additional tokens relative to the common token (Step 420); identifying domain name transformations (Step 430); and building a matrix of frequency occurrences for each of the domain name transformations (Step 440).

For each session record, dictionary aggregation software 330 may be configured to identify, within the record, a domain name search string. The dictionary aggregation software 330 may then tokenize each domain name search string (Step 410), possibly by comparing the domain name search string against a tokenization dictionary and identifying any tokens common to the search string and the token dictionary or by applying the Aho Corasick tokenizing algorithm described herein. Some embodiments may recognize entities within groups of tokens that belong together as a unit (e.g., ice+cream).

Thus, in the non-limiting example above, dictionary aggregation software 330 would identify the tokens "loan" and "star" (as well as the TLD ".com") within a search for loanstar.com, and would recognize the tokens "the," "loan," and "shack" within the search for theloanshack.com.

Dictionary aggregation software 330 may then identify a token or a string of tokens (possibly comprising an entity as explained above) common to records from the user session 315 (Step 420). In the example above, loanstar.com and theloanshack.com share the token/string "loan."

Dictionary aggregation software 330 may then align the common token/string in consecutive queries in order to determine the position of additional tokens in relation to the common token/string, thereby creating a map between tokens (Step 420). Non-limiting examples of such positions and mappings may include whether the additional tokens are adjacent to the common token/string, whether other tokens separate the token/string from the additional tokens, whether the additional tokens come before or after the common token/string, whether certain tokens have changed completely, etc. Thus, in the example above, "star," "the" and "shack" are all adjacent to the common token "loan," with "the" coming before "loan," and "star" and "shack" coming after. "Star" has been replaced with "shack" in this example.

Dictionary aggregation software 330 may use the determination of relative position between tokens, as well as the session id, user input, time stamp and sequential order of user input to identify domain name search string transformations or other token variations between session data records and/or user actions (Step 430).

The Dictionary aggregation software 330 may order the session data records sequentially according to the record's time stamp and/or sequential order within the data session records to reconstruct the original order of each action taken by the user. Dictionary aggregation software 330 may then analyze the user input from each data record in the session to identify the transformations and/or variations between each user input (Step 530).

As non-limiting examples, the types of domain name transformations may include replacement, translation, drop, swap, add, geographic, date and/or co-occur transformations. Explanations and non-limiting examples of these transformation types are seen in a non-limiting examples below in the context of a user searching available domain names for a bicycle-related website:

Replace: User replaces one token with another (possibly a synonym) in the same position relative to the common token/string (e.g., bike shop→bike store, replacing "shop" with "store");

Translation: Similar to Replace—User replaces one token with another in the same position relative to the common token, but translated into another language (e.g., bike house→bike casa, replacing "house" with "casa");

Drop: User drops a token from a co-occurrence (explained below) of tokens (e.g., bike shop→bike, deleting "shop" from the co-occurrence);

Swap: User swaps one token with a similar token or group of tokens, possibly changing its position in relation to the common token (e.g., mikes bikes→bikes by mike, replacing "bikes" with "by mike" and moving the phrase after, rather than before "bikes");

Add: User adds one or more tokens either before or after the original domain search, (e.g., bike→bike parts, adding "parts" after "bike");

Geographic: Similar to Add—User adds one or more geographic tokens either before or after the original domain search, (e.g., bike→bike phoenix, adding "phoenix" after "bike");

Date: Similar to Add—User adds one or more date-related tokens either before or after the original domain search, (e.g., tour de France→tour de FRANCE 2014, adding "2014" after "tour de France");

Co-occur: Any additional token added before or after the tokens in an original search or any modification to the original search (e.g., bike parts, bike and parts occur simultaneously); This may also simultaneously include replace, drop, swap, translation, add, geographic and/or date.

As seen in the co-occurrence definition/example, these transformations are not exclusive. In the replace example above, the software may determine a co-occurrence including the tokens "bike" and "shop," as well as "bike" and "store" respectively. The software may also recognize a replace transformation from "shop" to "store."

Dictionary aggregation software 330 may comprise, or may access logic in the knowledge base 305 or rules 345 to identify one or more domain name transformations. Logic in the knowledge base 305 may be seeded or may continually evolve using a data feedback loop from user logs or zone files 320 as described herein.

This logic may depend on a transformation dictionary within knowledge base 305, which may use rules 345 or other software instructions on how to identify the variations that identify specific types of domain name transformations.

At a high level, the transformation dictionary may identify the transformation as co-occurring, modified, a deletion or adding (before or after the common token/string). Co-occurring may include any original search with an additional token, possibly including replace, drop, swap, translation, add, geographic or date.

The logic for identifying additional transformations may do so relative to the common token/string. Thus, as non-limiting examples, if an initial user input includes the common token, but a subsequent user input includes additional tokens, dictionary aggregation software 330 may identify the subsequent user input as an add (possibly geographic or date if the additional token is geographically or date-related). If an initial user input includes the common token and one or more additional tokens, but a subsequent user input does not include at least one of the additional tokens, dictionary aggregation software 330 may identify the subsequent user input as a drop.

If the dictionary aggregation software 330 determines that a combination of an add and a drop have both occurred, and if the added token is in the same position relative to the common token/string, dictionary aggregation software 330 may identify the subsequent user input as a replace (possibly a translation if the additional token is in a language other than the original token). In the previous situation, if the replace has occurred, but the replacement's (or one of the additional tokens') position relative to the common token/string has changed, dictionary aggregation software 330 may identify the subsequent user input as a swap, and so forth.

Data storage 230 may store a running total of instances of each type of domain name transformation, possibly as one or more data records. As dictionary aggregation software 330 identifies each type of domain name transformation in each user session 315, the appropriate data record in data storage may be updated to reflect an incremented total number of instances for that type of domain name transformation.

Using the loanstar.com domain name search example above, dictionary aggregation software 330 may analyze the data records from the user's domain name search session 315 and determine that the subsequent search modifying loanstar.com to theloanshack.com included: a co-occurrence of "loan" with "star" and "loan" with "shack;" an add/prepend of the word "the" to the beginning of loanshack; and a replace of "star" with "shack."

Dictionary aggregation software 330 may then identify the appropriate running total of instances of co-occurrence, add and replace domain name transformations, possibly within data record(s). The running total for each of these transformation types may be incremented by one, and the incremented running total may replace the old one in the respective data records.

Dictionary aggregation software 330 may further analyze the data records for each session to determine the order in which each transformation type occurred and may store this data in data storage 230. In other words, the transformation type of the first transformation may be identified and stored in data storage, and/or incremented within data storage, as the first transformation, the transformation type of the second transformation may be identified and stored, and/or incremented, in data storage as the second transformation, and so on.

In addition to tracking the frequency of instances of transaction types and preferred orders for transaction types, dictionary aggregation software 330 may also identify the frequency of specific instances of domain name transformations, and store a record of these frequencies in data storage 230.

In some embodiments, data about a specific domain name transformation may be paired with a frequency or running total of that specific transformation in this general format: 1) token(s) involved in the domain name transformation; 2) transformation applied to the tokens (if applicable); and 3) frequency of the domain name transformation. Each of these pairings may be stored as records in a data table in data storage.

Below are two non-limiting examples of possible frequency matrix tables for co-occurrence and replacement domain name transformations respectively:

| Co-Occurrence | | |
|---|---|---|
| First | Second | Freq. |
| Law | Firm | 60585 |
| Skin | Care | 43315 |
| Pest | Control | 43007 |
| Carpet | Cleaning | 41609 |
| Vacation | Rentals | 19979 |
| Vacation | Rental | 10871 |
| Vacations | Rentals | 171 |
| Tunnel | Car | 34 |
| Carrot | Cakes | 20 |

| Replacement | | |
|---|---|---|
| From | To | Freq. |
| Now | Today | 21907 |
| Auto | Car | 18852 |
| Business | Biz | 9304 |
| Design | Creative | 7162 |
| Corp | Inc | 6591 |
| Soft | Tech | 6537 |
| 247 | 356 | 6278 |
| New | Nu | 4888 |
| Hub | Central | 2776 |

As dictionary aggregation software 330 tokenizes and analyzes each user entry in the user session data records, it may search the appropriate transformation frequency matrix to determine if that type of transformation including the same tokens has already occurred. If it has, the frequency of the transformation using those tokens may be incremented by one, via techniques similar to those outlined above for incrementing transformation type frequency. If it has not already occurred, a new coupling may be added to the appropriate transformation frequency matrix with the frequency field set to 1.

As frequency matrices, as well as running totals and preferred orders of transformation types continue to grow, they may comprise transformation and frequency dictionaries normalized between 0 and 1.0. Software logic or the data records comprising the frequency matrices themselves may be configured to normalize the frequency data in the range of 0-1.0, the highest frequency entry in the matrix being normalized to 1.0. For example, in the co-occurrence frequency matrix table above, "law" co-occurring with "firm" would be normalized to 1, with all other co-occurrences representing a percentage of 1.

In addition to content from Internet crawls 310 and logs from one or more user sessions 315, DNS zone files 320 may also seed and supplement data in the knowledge base 305 and dictionaries 325. DNS zone files 320 may comprise text files authoritatively describing DNS zones or DNS caches and may contain mappings between domain names and IP addresses and other resources. An example zone file 320 may be organized as text as follows:

; start of this zone file in the namespace
$ORIGIN example.com
; ns.example.com is a nameserver for example.com
example.com. IN NS ns
; ns.somewhere.example is a backup nameserver for example.com
example.com. IN NS ns.somewhere.example.
; mail.example.com is the mailserver for example.com
example.com. IN MX 10 mail.example.com.
; IPv4 address for example.com
example.com. IN A 192.0.2.1
; IPv6 address for example.com
IN AAAA 2001:db8:10::1
; IPv4 address for ns.example.com
ns IN A 192.0.2.2
; IPv6 address for ns.example.com
IN AAAA 2001:db8:10::2
; www.example.com is an alias for example.com
www IN CNAME example.com.
; wwwtest.example.com is another alias for www.example.com
wwwtest IN CNAME www
; IPv4 address for mail.example.com
mail IN A 192.0.2.3

Dictionary aggregation software 330 may identify individual domain names within the zone 320. In embodiments where server(s) 210 are hosted by a registrar, the registrar may provide the disclosed software regular access to zone files 320. As a non-limiting example, the registrar may download zone files 320 from registries daily and notify the disclosed software of the zone file 320 for access by the software.

The descriptions above regarding query tokenization, concept-based tokenization, identifying common tokens, aligning/mapping common tokens to additional tokens, identifying domain name transformations, building matrices of frequency occurrences, and any other processes described above regarding user sessions 315 may apply equally as well to the domain names identified within zone files 320. However, because the zone files 320 do not track decisions made by users in registering the domain name, dictionary aggregation software 330 may focus on co-occurrence transformations, such as geographic, date and translation transformations, as non-limiting examples.

The embodiments herein may "mine" the knowledge base 305 and the dictionary data 325 generated from Internet crawls 310, user search session 315 and domain name zone files 320, and may apply the appropriate rules 345 in order to make calculations and determinations about user's behavior to accomplish the method steps disclosed herein. Such data my be mined and analyzed at an individual, regional or global/universal level, thereby analyzing users' search sessions 315, purchase patterns, language choices, preferences, concepts the user is interested in, and vocabulary choices, as non-limiting examples.

Dictionaries and/or rules may also be applied specific to a user's language. Embodiments performing regional analysis may be language dependent, while more global embodiments may be language independent.

This body of data available to be mined may continue to grow and be refined via a data feedback loop, wherein, as data, such as user logs 315, zone files 320 and crawled Internet content data 310 is received and processed, more results are generated and refined. This refined data may generate more data and results, which may be used to continually refine the data, and so on. As a non-limiting example, as the dictionaries 325 continue to grow from Internet crawls 310, user session logs 315 and zone files 320, the runtime search engine 300 may improve the quality of suggested domain names, thereby generating more, and more accurate, data for the dictionaries 325.

Concepts may likewise grow and be refined, evolving as each language associated with the concept also evolves and changes over time. To accomplish this, dictionary aggregation software 330 may be configured to mine user search logs and zone files 320, on an individual, regional and/or global basis for: interchangeable concept units, the relevancy between any concept and TLD, one or more trending concepts, popular co-occurring concepts and/or concept unit enhancement (e.g., learning those interchangeable tokens/folksonomy from the knowledge base 305, and adding those new words back to the concept unit, then using the updated concept to mine the knowledge base 305 again).

Dictionary aggregation software 330 may mine interchangeable terms at a word level for each language in order to identify evolution of the concept including a new term in a language that comes into frequent use (e.g., tokens that emerge as frequently used due to social events).

To accomplish this identification, transformation dictionaries tracking token replace transformations may be monitored to determine any tokens that replace tokens associated with the concept during domain name searches. The dictionary aggregation software 330 may determine, based on this frequent use as a replacement for one or more tokens in the concept unit, that the frequently used token is a synonym of the replaced concept unit related token. Given its frequency by the user, dictionary aggregation software 330 may add the high-frequency use token to the concept unit, associating the new token with the concept unit via the concept ID.

Dictionary aggregation software 330 may likewise mine dictionaries monitoring the use of each word in the specific concept unit in order to identify evolution of the concept including terms in a language that come into infrequent use. Each of the tokens in the concept unit may be normalized to each other and to global totals for frequency in order to determine tokens that fall beneath a given threshold.

Based on the infrequency of use, data aggregation software 330 may identify the infrequently used token as a weakness to the overall strength of the concept, and remove the infrequently used token from the concept unit, possibly by removing the concept ID from the concept data record in data storage 230.

As each concept unit evolves, it may be used to mine concept level knowledge from the knowledge base 305 resources.

One or more runtime search engine software modules 300 may use the knowledge base 305, rules 345 and any dictionaries therein 325 to generate a plurality of suggested domain names. A user may access a domain name availability search interface communicatively coupled to the runtime search engine 300, possibly via a registrar website or other software. The user may then enter a query string into the interface on a client 220 in order to search the domain name. The software running on the client 220 may then transmit the query string to server(s) 210. Server(s) 210 may receive the query string and determine whether or not the domain name is available to be registered.

To accomplish such a domain name availability check, the disclosed software may check the generated domain name suggestions against one or more zone files 320 or the authoritative source, such as a registry or ICANN, for those domain names. The domain name suggestion engine for search engine 330 may then filter out all unavailable domain names, displaying only available domain names to users.

If the search engine 300 determines that the domain name is not available to be registered (or if the domain name registrar would also like to recommend additional domain names), the search engine software 300 may tokenize the query string according to the tokenizing methods previously described.

The search engine software 300 may generate a plurality of domain names with common tokens and/or entities detected in the domain name search string, generate domain names based on access to the knowledge base 305 on name transformations. In other words, the search engine software 300 may compile an aggregation of domain names including the closest common words and transformations, based on the available most frequent transformation types and co-occurring tokens.

Some embodiments may identify, during the process of tokenizing and identifying tokens, tokens capable of reflecting a pattern in user activity, so that the search engine software 300 may suggest domain names based on recognized patterns in user behavior. Such user patterns may include tokens indicating a user behavior that occurs in a logical sequence. As a non-limiting example, "bicycle" would not be part of a natural sequence, but "3rd birthday" would.

As seen in FIG. 6, software running on the server(s) 210 may be configured to: receive a domain name search string (Step 600); identify: a token, within the domain name search string, reflecting a user pattern (Step 610); a subsequent sequential step for the user pattern (Step 620); and an available domain name comprising a string reflecting the subsequent sequential step (Step 630); and transmit the available domain name to a client computer communicatively coupled to the network (Step 640).

In embodiments that recognize domain suggestions based on such sequential patterns in user behavior, a user pattern data dictionary may be seeded by any seeding entities previously described, and may include characters, words and/or numbers associated with known user patterns and sequences. In some embodiments, these user pattern dictionaries may be integrated into existing tokenization dictionaries. Other user pattern dictionaries may include dictionary data based on geographic data, calendar data, product data, user-specific data, etc.

Rules 345 may work in conjunction with dictionaries 325 to identify the user patterns and the sequences associated with them, thereby determining the next numerical or logical step in the user pattern sequence to be applied to the suggested domain name(s). Disclosed software modules may use the instructions in rules 345 to apply the logic to the word/number, geographic, calendar, product, user dictionaries or any other dictionaries.

Logic in the rules 345 may be applied to a user pattern dictionary comprising simple numerical values and sequences. As non-limiting examples, these simple numeric values dictionaries may include any real numbers and rules 345 defining sequences between them (e.g., whole numbers incremented one by one, iterations, multiples, etc.).

In embodiments for simple numeric values, the disclosed software may tokenize the string, identify the simple numeric value, and determine the next logical number/iteration in the sequence according to rules 345.

In this and all disclosed user-pattern based embodiments, during a search for available domain names as disclosed herein, the disclosed software may access zone files 320, user session logs 315, dictionaries 325 or any other data available in the knowledge base 305 or via Internet crawl 310, to determine the next sequence available for registration. (e.g., in the embodiments below comparing a dictionary of known words associated with sequences, "Olympic" domain names are currently registered through 2050, so the next sequence available would be 2054). The disclosed software may then identify the original matched token, append the identified next token in the sequence, as well as any additional characters, additional strings or token order according to the rules of the respective embodiments, and generate a suggested domain name to be suggested to the user.

In some user-pattern based embodiments, related websites may be crawled to confirm the accuracy of the rules surrounding the pattern. Such crawls may comprise a data feedback loop as previously described. As a non-limiting example, a product may be mentioned in the news and the product name and version number may be added to the user pattern dictionary as a product name associated with a particular version number. This data may feed a search in the next crawl for a search of a website for the product, and the product website may provide additional data used to better understand the pattern associated with the product's version number, and so forth.

Logic in the rules may be applied to a user pattern dictionary comprising irregular numeric values and sequences. As non-limiting examples, these irregular numeric values dictionaries may include any combination of words and numeric values (e.g., 2016 Olympics, Election 2012, Jane's sweet 16, etc.) and rules 345 defining sequences between them (e.g., Olympics and elections occur every 4 years, sweet 16 comes 16 years after birth date, etc.).

In these embodiments, the tokenized words may be compared with a dictionary of known words associated with sequences (e.g., "Olympic," "election," "leap year" etc.) to identify matches. If a match is found, rules 345 associated with those words may be applied (e.g., sequence is each 4 years). In some embodiments, related websites may be crawled to confirm the accuracy of the rules surrounding the pattern. If additional or contradictory information is found, the rules 345 may be updated accordingly. The domain name may then be generated and displayed to the user as previously disclosed.

Logic in the rules may be similarly applied to a user pattern dictionary comprising irregular numeric values and sequences including characters. As non-limiting examples, these irregular numeric values dictionaries may include any combination of characters, words and numeric values, and often may be applied to product models, versions and families (e.g., iPhone 6s+, Samsung Galaxy Gold S7, Acura2015MDX, Kindle/Fire HDX), software versions (Windows 2000, Windows ME), conferences (e.g., WWW2015, WWDC15) and rules 345 defining sequences between them (e.g., iPhone 6s includes Siri).

In these embodiments, the tokenized words, numbers and characters may be compared with a dictionary of known products or other word/number/character strings associated with sequences (e.g., "iPhone," "Samsung/Galaxy," "Acura," "Kindle/Fire," etc.) to identify matches. If a match is found, rules 345 associated with those words may be applied (e.g., version number of iPhone changes, but Siri enabled phones include an "s"). In some embodiments, related websites possibly including product, software or conference websites, may be crawled to confirm the accuracy of the rules surrounding the pattern. If additional or contradictory information is found, the rules 345 may be updated accordingly. The domain name may then be generated and displayed to the user as previously disclosed.

Logic in the rules may be applied to a user pattern dictionary comprising quasi numeric values and sequences. As non-limiting examples, these quasi numeric values dictionaries may include any combination of characters, words, numbers (including roman numerals), and ordinal numbers (e.g., Caseys1stBirthday, CaseysSweet16, 10thAnniversary, StarWarsVII) and rules 345 defining sequences between them (e.g., Sweet16 is sixteen years after birth date, 10th anniversary is 10 years after wedding date, I=1, V=5).

In these embodiments, the tokenized words may be compared with a dictionary of known words, phrases, numbers and characters associated with sequences (e.g., "birthday," "anniversary," "sweet 16" etc.) to identify matches. If a match is found, rules 345 associated with those words may be applied (e.g., sweet 16=sixteenth birthday). In some embodiments, related websites may be crawled to confirm the accuracy of the rules surrounding the pattern. If additional or contradictory information is found, the rules 345 may be updated accordingly. The domain name may then be generated and displayed to the user as previously disclosed.

Logic in the rules may be applied to a user pattern dictionary comprising geographic values and sequences. As non-limiting examples, these geographic values dictionaries may include any combination of geographic data including address information (street information, cities, states, zip codes) and rules 345 defining sequences between them (e.g., 90210 is adjacent to 90209 and 90211, roads East of Central are sequential as "Streets" and West are sequential as "Avenues").

In these embodiments, the tokens may be compared with a dictionary of geographic related tokens (e.g., "zip code," "real estate," etc.) to identify matches. If a match is found, rules 345 associated with those tokens may be applied (e.g., adjacent zip, roads are sequential East as Streets, and sequential west as Avenues). In some embodiments, related websites may be crawled to confirm the accuracy of the rules surrounding the pattern. If additional or contradictory information is found, the rules 345 may be updated accordingly. The domain name may then be generated and displayed to the user as previously disclosed.

In these embodiments, when suggested domain names are generated, additional tokens may be concatenated to generate an available domain name (e.g., 90209realestate, 90210realestate, 14455HaydenRd, 14455HaydenRdScottsdale, etc.)

Logic in the rules may be applied to a user pattern dictionary comprising user-specific values and sequences. As non-limiting examples, these user-specific values dictionaries may include any combination of user-specific data from a user's customer administrative records or scraped from Internet crawls 310 of social media accounts associated with the user. Such data may include contact data (address, email) or data relating to events or regular occurrences (birthday, wedding date, children's birthdays, moves, home purchases, vacations, engagements, etc.) and rules 345 defining sequences between them (e.g., Anniversaries and birthdays occur each year, annual vacations include an annual photo album, etc.).

In these embodiments, the tokens may be compared with a dictionary of geographic related tokens (e.g., "birthday," "anniversary," "vacation," etc.) to identify matches. If a match is found, rules 345 associated with those tokens, including any rules from any previously disclosed embodiments, may be applied (e.g., annual vacation includes links to websites titled "FamilyVacation2013" and "FamilyVacation2014" so the next domain name should include "FamilyVacation2015"). In some embodiments, related websites may be crawled to confirm the accuracy of the rules surrounding the pattern. If additional or contradictory information is found, the rules 345 may be updated accordingly. The domain name may then be generated and displayed to the user as previously disclosed.

One or more language modeling software modules 335 may comprise a language-model filter for removing grammatically incorrect or generally unpopular domain names from the list of domain name suggestions generated from the search engine 300.

The language modeling software 335 may tokenize each of the aggregated suggested domain names using any tokenization techniques described herein. The language model software 335 may then compare co-occurring tokens from the suggested domain names with the co-occurrence-related dictionaries in order to identify matching co-occurring tokens. If not previously done, the language modeling software 335 may normalize the highest frequency co-occurrence to 1, and normalize all other entries accordingly (i.e., by dividing the frequency of each entry by the highest frequency entry).

The language model software 335 may then analyze the normalized frequency data to identify any pairings in the co-occurrence dictionaries with low frequencies of co-occurrences for specific pairings. The language modeling software 335, working with the search engine software 300 may then filter out domain name suggestions with matching low frequency co-occurrences in the co-occurrence dictionaries.

In some embodiments, language modeling software 335 may analyze the differences between the co-occurring tokens, as well as the characters and possibly parts of speech within the co-occurring tokens to determine the grammatical inconsistencies that may cause the low frequencies for individual co-occurrence pairings. This analysis may be done via distance analysis such as Jaccard or Levenschtein distance analyses.

The Jaccard index may comprise a statistic used for comparing the similarity and diversity of sample sets, defined as the size of the intersection divided by the size of the union of the sample sets. The Jaccard distance measures dissimilarity between sample sets, determined by subtracting the Jaccard index from 1, or dividing the difference of the sizes of the union and the intersection of two sets by the size of the union.

The Levenshtein distance (or edit distance) is a string metric for measuring the difference between two sequences. Informally, the Levenshtein distance between two words is the minimum number of single-character edits (i.e. insertions, deletions or substitutions) required to change one word into the other.

As a non-limiting example, a user may search the availability of the domain name vacationrental.com. If this domain name is unavailable, the search engine software 335 may include the domain name vacationsrentals.com in the recommended list of available domain names. Language modeling software 335 may then tokenize the vacationsrentals.com domain name, resulting in the tokens "vacations" and "rentals." Language modeling software 335 may then filter this domain name from the domain name recommendation set because of these tokens' low frequency of co-occurrences.

Using the co-occurrence matrix/table displayed above as a non-limiting example, language modeling software 335 may normalize the "vacations" and "rentals" co-occurrence to 0.002. The highest frequency co-occurrence "law" and "firm" may be set to 1.0 for normalization purposes, so all other co-occurrences may be normalized by dividing the frequency for those co-occurrences by 60,585. Thus, the co-occurrence "vacations" and "rentals" would be 171/60,585 or 0.002.

Language modeling software 335 may be configured to discard all domain name suggestions under a predetermined normalized percentage. In this non-limiting example, any co-occurrence under 1% may be discarded as having some sort of grammatical error, so vacationsrentals.com may be removed from the plurality of domain name suggestions.

Using the Jaccard and/or Levenschtein distance analyses, the software may determine that the difference between the characters in vacation rental, vacation rentals and vacations rentals is based on the additional s on each (thereby creating two juxtaposed plurals), and therefore determine, based on the frequency, that the most popular is co-occurrence is one single and one plural token.

Language modeling software may utilize a concept based language model as an integral component to a concept-based domain name recommendation engine. Such a concept based domain name suggestion engine may broaden the scope of suggested domain names to include results for different languages and regions, as the analysis is done on a concept basis rather than a token basis. In these embodiments, search engine software 300 may utilize a concept-based domain name recommendation engine built on top of concepts, so that the search engine software is configured to include a concept-based tokenizer, a ranking function for TLDs, concept level SLD spinning, and concept-based name rendering across languages, as non-limiting examples.

A flow chart for an example embodiment is shown in FIG. 7, the search engine software 300/server(s) 210 may be configured to: receive a domain name search string (Step 700); tokenize the domain name search string (Step 710); identify one or more languages and one or more concepts via a multi-language tokenizer (Step 720); and recommend at least one available domain name comprising the one or more concepts and the one or more languages (Step 730).

Language and concept detection may be accomplished using a multi-lingual tokenizer. This multi-lingual tokenizer may utilize the previously described Aho-Corasick algorithm to build a finite state machine capable of tokenizing the domain name into a sequence of tokens and their corresponding language and concepts.

Multiple interpretations may exist for the tokenization of the domain name search string, due to multiple possible ways to tokenize the same domain name search string query. As a non-limiting example, a user searching faradventures.com could be interpreted by the disclosed system as "far adventures" or "farad ventures." Using the tokenized sequence of concepts, an n-gram based concept language model may provide the most likely token sequence based on the most frequently used identified concept.

While generating domain name suggestions, search engine software 300 may integrate concepts trending across data in the knowledge base 305, as well as session data 315 for individual users. The disclosed software may mine data in the knowledge base 305, including search logs, zone files 320 and Internet crawls 310 as disclosed herein, on an individual, regional and/or global level, based on intra-concept term membership and inter concept correlation level. This data may be used to determine concept frequency and co-occurrence frequency among concepts in order to build a concept language model on top of a concept, rather than on top of one or more individual tokens.

The disclosed software may use this concept language model to rank different ways of segmenting the domain name search strings. As a non-limiting example, the disclosed software may extract and tokenize multilingual data from the knowledge base 305, including multilingual registrar search logs, multilingual zone files 320, multilingual web crawls and/or multilingual social feeds, as disclosed herein, to rank one or more TLD spins accordingly. These TLD spins may include generic TLDs (gTLD) or country code based TLDs (ccTLDs) as described below.

The extracted data may be analyzed and the recommended domain names may be ranked according to a relatedness dictionary. This relatedness dictionary may be generated according to a relatedness calculation which computes the mutual information between a concept and a TLD.

Prior to running this relatedness calculation, the disclosed software may filter out person names (first, last and/or middle), or any geographical names such as neighborhoods, towns, cities, counties, states, countries, etc. for gTLDs, and person names for ccTLDs.

This relatedness calculation may include a pointwise mutual information (PMI) calculation at a concept level. The PMI may measure the relevance between any concept and any TLD. The PMI for a concept with respect to a TLD may be defined as PMI(concept,tld)=−log (P(concept, TLD)/P(concept)*P(TLD)), where P(concept,TLD) represents the join probability of the concept and TLD; P(concept) represents the probability that the concept occurred in the sample universe; and P(TLD) represents the probability that the TLD occurred in the sample universe.

Running the relatedness calculation may include calculating the PMI directly from the zone files 320. First, all domains may be tokenized, and their concepts detected across all zone files 320. All PMI(concept,tld) may be computed. Similarly, PMI may also be computed using domain search logs as well as web crawl documents. PMI measurements may be combined from all data sources to produce the final association score.

At runtime, the name suggestion may first tokenize a user's query and detect its concept. It may then use the above combined PMI scores for each query concept to retrieve/rank the relevant TLDs accordingly.

A similar approach may be taken in mining concepts highly relevant to ccTLDs. ccTLD domain name spins may be ranked as follows. When the available domain name search is performed, geographical data about the user may be determined. This user's geographical location may be determined via: a user's physical address within a user's profile; identifying a ccTLD as part of a shopper's domain name query; identifying a geographical location from an SLD portion of the user's domain name query; any other known means of determining a user's geographical location; or any combination thereof.

The same methodology disclosed above may be applied to ccTLD zone files 320 using PMI to pull out those highly relevant concepts with respect to ccTLD. Whenever a relevant concepts show up in a user's domain name query, the available domain names from the domain name spin may reflect trends in the geographical location associated with the geographical location data. The corresponding ccTLDs may then be suggested to users.

The data in the knowledge base 305 may be used to learn interchangeable concepts. These interchangeable concepts may be used to replace concept portions of SLDs in recommended domain names. To accomplish this, data mining, tokenization and concept detection as previously described (both generally and in regards to the relatedness dictionary described above) may be performed. The disclosed software may identify at least one replaceable concept, generate a replaceable concept dictionary from the at least one replaceable concept and rank the recommended available domain names according to the replaceable concept dictionary.

Identifying at least one replaceable concept may include applying an algorithm identifying a longest common string for a common concept between consecutive domain name queries; identifying a relative position for the longest common string between the consecutive domain name queries; and extracting a replaceable concept coupling from one or more replaceable concept pairs.

To learn interchangeable concepts and their popularity from search logs, knowledge base 305 may comprise search logs containing user search sessions 315 across all regions in many languages. These search logs may be sessionized according to a user id and/or a browser cookie. For all search sessions 315 coming from all regions in many languages, every query may be tokenized into a sequence of concepts. For each consecutive query pair in a search session 315, the sequence of concepts may be compared and a longest common string algorithm may be applied to find out those concepts being replaced. As a non limiting example, a result triple may be generated as (concept A, concept B, 1) where concept A is discovered being replaced by concept B one time by a user. (i.e., frequency is one).

All interchangeable concept triples identified in all search sessions 315 may be aggregated as the concept triples as a dictionary, and a report may be generated, with any record in the dictionary being formatted as (concept A, concept B, frequency). The frequency may denote the popularity of concept A being replaced by concept B. At runtime, the name suggestion engine may put more weights on those popular concept spins.

Learned interchangeable concepts discovered in the search logs may be learned globally and applied to any language when available domain names are being suggested.

The disclosed system and software may suggest domain names in different languages in proportion to multiple languages used globally, in a certain region or by a certain individual. To suggest these domain names in the correct mix, the disclosed software may detect a language represented by the at least one token; calculate a ratio of the language compared to at least one other languages stored in a database; and recommend at least one available domain name proportionate to the ratio.

As a non-limiting example, Canadian users may register both English and French based domain names. Whether globally, regionally or individually, the disclosed system may mine the search logs, detect the language of each domain name query, then compute the ratio of language. The language ratio may then be used in the disclosed system.

In the example above, Canada search logs may be monitored, determining that 70% of queries are in English and the other 30% are in French. The disclosed system may then recommend 70% English domain names and 30% French names as the results.

Similarly, the disclosed system may learn users' language preference from users' past searches. The disclosed system may then show more names in the languages which the shoppers expressed in the name queries in their search history.

The disclosed software may perform language rendering after deciding the languages and their corresponding ratio the system should show. For each concept specified in a spin, the system may find several suitable words in the desired language from the corresponding concept unit.

As a non-limiting example, the concept "bicycle" can be replaced with words such as "bike", "cycle", "bicycle", or "bikes," resulting in several replacement concept candidates. Some of these replacement concept candidates may not make sense because they don't follow the proper grammar for the language.

For example, in generating a replacement for the concept "bikeshop," one generated concept replacement candidate may include "bikesshop" resulting in incorrect grammar. Such candidates may run the language model methods disclosed herein and filter out low-quality suggestions.

An availability check may be performed as previously disclosed. Different types of domain name suggestions may be blended together when a domain name recommendation is made, including, but not limited to: domain names in different languages, domain names in different gTLD, ccTLD names; SLD spins, etc. Such a domain name suggestion blender may be data driven, learning a desired inventory mix from search and purchase logs. The determined mix ratio may then be applied to search result pages.

One or more domain name suggestion ranking software modules 340 may comprise a component for ranking the aggregation of domain name suggestions generated from the search engine 300. This domain ranking software 340 may use machine learning algorithms in combination with a plurality of training data from the knowledge base 305, or from other sources, to rank these domain name suggestions in order of likelihood that domain names within the aggregation will be registered based on relevance to the original query terms, or in other words, relevance of the token(s) with respect to the original query terms indicated by the frequencies as the feature, or according to which type of domain name transformations are the most popular.

As data from user data logs 315 is added to the knowledge feedback loop for dictionaries 325 within knowledge base 305, data from these search samples may also generate training data, a massive matrix of training sets/data using the data from the search sessions 315. In some embodiments, these training data sets from user session log data 315 may be manually reviewed. In the user search sessions 315, all purchased domain names may be treated as positive examples for answer purposes.

Non-limiting purposes of the machine learning algorithms used to rank the domain name suggestions include using query sessions 315 to construct the training sets. Suggestions that become registered domain names may be treated as positive training examples, while suggestions in a higher suggested position that are not purchased may be treated as negative examples.

Multiple examples may be used to construct a training set. Using extracted features and labels, the disclosed algorithm may train a ranking model that may optimize the purchase likelihood. In some embodiments, a gradient boost decision tree may be preferable, but any modeling methods such as support vector machine or logistic regression may also be used.

In a non-limiting example of determining positive and negative examples from suggestion position during a search session 315, where a user query may be "pizza store," and the suggested domain names may be generated and presented to the user as follows:

| | | | |
|---|---|---|---|
| 1. | pizzastore .menu | | $29.99 |
| 2. | pizzastore .pub | | $23.99 |
| 3. | pizzastore .co | Premium | $100.00 Renewal price $24.99 |
| 4. | pizzashop .menu | | $29.99 |
| 5. | pizzeriamart .com | | $8.29 |
| 6. | pizzastore .org | Premium | $2,188.00* Renewal price $8.99* |
| 7. | pizzastores .menu | | $29.99 |
| 8. | pizzastore .bar | | $59.99 |
| 9. | pizzastore.direct | | $23.99 |
| 10. | pizzastores.com | | $8.29 |

In this example, the user may have registered the bolded domain name, the eighth suggestion. In this example, pizzestore.bar may be the positive example. Note that this shopper owns pizzaBar.com in this example. It is possible that he/she purchased the eighth suggestion because he/she likes "bar" in the name. It is also possible that he/she brought the name because the name is simply shorter than the others.

In this example, all name suggestions above eighth suggestion may represent negative examples. It is highly likely that this user scanned through names from position 1 to position 8 and did not like the first seven suggestions. These suggestions are therefore treated as negative examples. Suggestions below position 8 may be ignored since it's impossible to be sure if this user reviewed them or not.

No limit should be placed on the amount of machine learning/training data matrix that may be used in the disclosed embodiments. Each of these training data sets may comprise several features relevant to the training set and the data to be processed. Each of these sets of features may be extracted capturing similarities in the query and the suggestion, and may comprise simple data, possibly reduced to simple numerical entries. These extracted feature sets may be used to capture similarities in the query and each of the domain name suggestions.

In the context of the current invention, the following features may be included in the data sets, as non-limiting examples:

1) Category information and strength;
2) The score of the language model;
3) A numeric score against the language model, described above, penalizing scores that do not follow proper grammar;
4) a length of the suggestion;
5) A length of the result;
6) Synonym spinning, determining what is a synonym to spin frequency, possibly using the appropriate dictionaries;
7) A user's geographical location such as city, county, region, and country. The machine learning model may identify popular terms for any such region through model training process. For example, a model applying this information may suggest "hire a car" to UK users and "rent a car" to US users. As another example, the model could learn that New York users love gTLD such as .nyc so it would rank .nyc names higher.

8) Shopper's industry—a user's industry may be identified by mining a user's domain portfolio. For example, restaurant owners are likely to have domain names with terms such as café, restaurant, or cuisine. Users may be classified into their industries by looking into the terms used in their purchased/searched domains and number of domains owned. It should be noted that the token dictionary has category information which may be collected from the Internet and/or the machine learning may be trained specifically using manual labeled data.

9) User's purchase power—defined as the highest price the user ever paid for a domain name. In most cases, users ignore those names that are much higher than their price range. The machine learning module learns such patterns and demotes high priced names.

10) Price of suggested domain names—Most users prefer low-price and highly relevant names. The price of good names should align with shopper's purchase power.

11) Term purchase frequency for most recent month—For each query term, the machine learning algorithms may pull a user's corresponding purchase frequency for past month. The purchase frequency may comprise part of the dictionary which the system updates periodically by mining the search logs. This feature may capture trending terms that have sold well recently.

12) Term impression frequency for most recent month—For each query term, the machine learning algorithm may pull its impression frequency as domain name suggestions. This feature may indicate the term favored by the ranking module 340. Ideally, the purchase frequency and impression frequency may be perfectly aligned. However, in practice, gaps may exist in these frequencies. By exposing these impression/purchase as features to the ranking module 340, the ranking module 340 may learn from the gaps and may be configured to construct better models that would align impression/purchase better.

The Levenschtein distance/overlap, and what characters changed over what distance, between the tokenized query and suggestion(s) may determine how many characters are the same between what is searched and what is suggested. In other words, it may determine which characters are deleted and which characters are swapped between query and suggestion(s).

The Jaccard distance/overlap between the tokenized query and suggestion(s) may determine how many tokens are the same between what is searched and what is suggested.

The rewrite strength (i.e., frequency of transformation) may include transformation (for all transformation types) from query to spin and normalized probability (e.g., shop-→store=0.9).

Each training set may include an answer. In some training sets, this answer may comprise a numerical aggregation of the fields, such as a sum or average, or may comprise a Boolean value. In the context of the current invention, the answer may comprise an aggregated score and/or average/percentage determine a likelihood of registration, or may comprise a Boolean value indicating whether the domain name was registered or will most likely be registered.

By combining the existing data sets and the answer to each of the data sets, machine learning may be programmed to use the features to describe a new data set, such as a recommended domain name(s), in the context of the current invention. The machine learning may construct a matrix that uses the distance between the feature factor provided (by the user) and then normalizes as previously described.

To determine a current data set's answer, a user may enter all the data into the matrix of all training/data features but leave the answer blank. The machine learning algorithm may look at all entered features and generate an answer of which data set the entered data set has the most in common with. In the context of the current invention, the domain ranking software 340 may rank domain names according to likelihood that domain name will be registered, with the which is most likely to, or it could be a very simple score function, so for each feature is given some weight, then computes a final score which captures the relevancy between the original query and the suggestion.

The domain ranking software 340 may then order the suggested domain name(s) by rank and transmit the output to client computer 220.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention. As examples, while the invention has been described in detail for spinning domain names, the invention may also be used to spin name identifiers in other fields. As specific non-limiting examples, the invention may also be used to spin name identifiers for license plates, phone numbers and social media name identifiers.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A method, comprising the steps of:
receiving, by a server computer communicatively coupled to a network and comprising at least one processor executing specific computer-executable instructions within a memory, via a first graphical user interface (GUI) for a multi-lingual domain name search engine displayed on a client computer, a domain name search string;
tokenizing, by the server computer, the domain name search string;
identifying, by the server computer, a search string token within the domain name search string as a concept seed;
executing, by the server computer, a first database command to create a data record storing the search string token in association with a concept id;
executing, by the server computer, a crawl of:
a domain name search log, or
at least one domain name system (DNS) zone file;
tokenizing, by the server computer, at least one domain name text string within the domain name search log or the at least one DNS zone file;
identifying, by the server computer, within the at least one domain name text string, at least one synonym or translation of the search string token;
executing, by the server computer, a second database command to create at least one data record storing:

the at least one synonym or translation of the search string token;
the concept id; and
at least one language associated with the at least one synonym or translation;
identifying, by the server computer, based on the search string token in the domain name search string, at least one concept comprising a collection of the at least one data record sharing the concept id;
generating, by the server computer, a second GUI including a displayed list recommending at least one available domain name comprising the at least one concept in the at least one language, the displayed list being ordered according to a frequency of use of the at least one concept; and
transmitting, by the server computer, the second GUI to the client computer for display.

2. The method of claim 1, further comprising a tokenizer configured to:
tokenize the domain name search string into a sequence of tokens corresponding to the at least one concept; and
detect the at least one language.

3. The method of claim 1, wherein the at least one concept comprises a plurality of tokens each comprising a base word and:
at least one translation of the base word into an additional language;
at least one lemma of the base word; or
at least one synonym of the base word.

4. The method of claim 1, wherein recommending the at least one available domain name comprises:
determining, by the server computer, a co-occurrence frequency of the at least one concept from:
at least one user session; or
at least one domain name zone file; and
identifying, by the server computer, the at least one available domain name according to a concept dictionary using the co-occurrence frequency of the at least one concept.

5. The method of claim 1, wherein recommending the at least one available domain name further comprises the steps of:
running, by the server computer, a relatedness calculation;
generating, by the server computer, a relatedness dictionary from the relatedness calculation; and
ranking, by the server computer, the at least one available domain name according to the relatedness dictionary.

6. The method of claim 5, wherein running the relatedness calculation further comprises the steps of:
tokenizing, by the server computer, a plurality of tokens from a plurality of domain names across a plurality of user session logs, domain name zone files or Internet documents;
generating, by the server computer:
a plurality of pointwise mutual information measurements; and
a final association score from the plurality of tokens; and
identifying, by the server computer:
at least one concept based on the search string token; and
at least one top level domain based on the final association score for the plurality of tokens; and
ranking the at least one top level domain for each at least one concept according to the final association score.

7. The method of claim 1, further comprising the steps of:
identifying, by the server computer, a geographic location data associated with the domain name search string; and
customizing, by the server computer, the at least one available domain name to at least one concept coming into higher usage in the geographic location associated with the geographic location data.

8. The method of claim 1, wherein recommending the at least one available domain name further comprises the steps of:
identifying, by the server computer, at least one interchangeable term;
generating, by the server computer, an interchangeable term dictionary from the at least one interchangeable term; and
ranking, by the server computer, the at least one available domain name according to the interchangeable term dictionary.

9. The method of claim 8, wherein identifying the at least one interchangeable term further comprises the steps of:
applying, by the server computer, an algorithm identifying a string alignment for a common concept between a plurality of consecutive domain name queries;
identifying, by the server computer, a relative position for the string alignment between the plurality of consecutive domain name queries; and
extracting, by the server computer, a coupling for at least one interchangeable term.

10. The method of claim 2, wherein recommending at least one available domain name comprises:
calculating, by the server computer, a ratio of the at least one language compared to at least one other language stored in a database; and
recommending, by the server computer, the at least one available domain name proportionate to the ratio.

11. The method of claim 1, further comprising the step of identifying at least one word in the at least one language corresponding to a concept unit stored in the database.

12. A system, comprising a server computer communicatively coupled to a network and comprising at least one processor executing computer-executable instructions within a memory that, when executed, cause the system to:
receive, via a first graphical user interface (GUI) for a multi-lingual domain name search engine displayed on a client computer, a domain name search string;
tokenize the domain name search string;
identify a search string token within the domain name search string as a concept seed;
execute a first database command to create a data record storing the search string token in association with a concept id;
execute a crawl of:
a domain name search log, or
at least one domain name system (DNS) zone file;
tokenize at least one domain name text string within the domain name search log or the at least one DNS zone file;
identify, within the at least one domain name text string, at least one synonym or translation of the search string token;
execute a second database command to create at least one data record storing:
the at least one synonym or translation of the search string token;
the concept id; and at least one language associated with the at least one synonym or translation;

identify, based on the search string token in the domain name search string, at least one concept comprising a collection of the at least one data record sharing the concept id;

generate a second GUI including a displayed list recommending at least one available domain name comprising the at least one concept in the at least one language, the displayed list being ordered according to a frequency of use of the at least one concept; and transmit the second GUI to the client computer for display.

13. The system of claim 1, further comprising a tokenizer configured to:

tokenize the domain name search string into a sequence of tokens corresponding to the at least one concept; and detect the at least one language.

14. The system of claim 12, wherein the at least one concept comprises a plurality of tokens comprising a base word and:

at least one translation of the base word into an additional language;

at least one lemma of the base word; or at least one synonym of the base word.

15. The system of claim 12, wherein the server computer is further configured to:

determine a co-occurrence frequency of the at least one concept from:

at least one user session; or at least one domain name zone file; and identify the at least one available domain name according to a concept dictionary using the co-occurrence frequency of the at least one concept.

16. The system of claim 12, wherein the server computer is further configured to:

run a relatedness calculation;

generate a relatedness dictionary from the relatedness calculation; and rank the at least one available domain name according to the relatedness dictionary.

17. The system of claim 16, wherein running the relatedness calculation further comprises the steps of:

tokenizing a plurality of tokens from a plurality of domain names across a plurality of user session logs, domain name zone files or Internet documents;

generating:

a plurality of pointwise mutual information measurements; and a final association score from the plurality of tokens; and identifying:

at least one concept based on the search string token; and at least one top level domain based on the final association score for the plurality of tokens; and ranking the at least one top level domain for each at least one concept according to the final association score.

18. The system of claim 12, wherein the server computer is further configured to:

identify a geographic location data associated with the domain name search string; and customize the at least one available domain name to at least one concept coming into higher usage in the geographic location associated with the geographic location data.

19. The system of claim 12, wherein the server computer is further configured to:

identify at least one interchangeable term;

generate an interchangeable term dictionary from the at least one interchangeable term; and rank the at least one available domain name according to the interchangeable term dictionary.

20. The system of claim 19, wherein identifying the at least one interchangeable term further comprises the steps of:

applying an algorithm identifying a string alignment for a common concept between a plurality of consecutive domain name queries;

identifying a relative position for the string alignment between the plurality of consecutive domain name queries; and extracting a coupling for the interchangeable term.

* * * * *